US012592553B2

(12) United States Patent
Pancheshnyi et al.

(10) Patent No.: US 12,592,553 B2
(45) Date of Patent: Mar. 31, 2026

(54) SOCKET

(71) Applicant: Hitachi Energy Ltd, Zürich (CH)

(72) Inventors: Sergey Pancheshnyi, Zürich (CH); Jan Czyzewski, Cracow (PL)

(73) Assignee: Hitachi Energy Ltd, Zürich (CH)

( * ) Notice: Subject to any disclaimer, the term of this patent is extended or adjusted under 35 U.S.C. 154(b) by 360 days.

(21) Appl. No.: 17/926,358

(22) PCT Filed: May 4, 2021

(86) PCT No.: PCT/EP2021/061717
§ 371 (c)(1),
(2) Date: Nov. 18, 2022

(87) PCT Pub. No.: WO2021/233679
PCT Pub. Date: Nov. 25, 2021

(65) Prior Publication Data
US 2023/0216288 A1 Jul. 6, 2023

(30) Foreign Application Priority Data
May 19, 2020 (EP) .................................... 20175490

(51) Int. Cl.
*H02G 15/072* (2006.01)
*H01R 13/66* (2006.01)
*H01R 24/28* (2011.01)
*H01R 24/76* (2011.01)
*H01R 101/00* (2006.01)

(52) U.S. Cl.
CPC ....... *H02G 15/072* (2013.01); *H01R 13/6625* (2013.01); *H01R 24/28* (2013.01); *H01R 24/76* (2013.01); *H01R 2101/00* (2013.01)

(58) Field of Classification Search
CPC .. H02G 15/072; H01R 13/6625; H01R 24/28; H01R 24/76; H01R 2101/00
USPC ........................................................ 439/732
See application file for complete search history.

(56) References Cited

U.S. PATENT DOCUMENTS 3,005,868 A * 10/1961 Linderholm ........... H02G 15/30
174/143
3,588,319 A 6/1971 Isogai et al.
3,845,235 A 10/1974 Bahder et al.
(Continued)

FOREIGN PATENT DOCUMENTS

DE 3048285 A1 7/1982
DE 4445406 C1 3/1996
(Continued)

OTHER PUBLICATIONS

International Search Report and Written Opinion of the International Searching Authority, PCT/EP2021/061717, mailed Jul. 21, 2021, 13 pages.
(Continued)

*Primary Examiner* — Gary F Paumen
(74) *Attorney, Agent, or Firm* — Sage Patent Group

(57) ABSTRACT

A socket, connectable to a plug-in device, wherein the plug-in device is a bushing and/or a plug-in cable termination, is described. The socket includes a current conduction path and a field control unit. The field control unit includes a layer arrangement with at least three conductive layers arranged around the current conduction path and separated by an insulating material.

19 Claims, 2 Drawing Sheets

(56) References Cited

U.S. PATENT DOCUMENTS

| | | | |
|---|---|---|---|
| 8,455,763 B2 | 6/2013 | Dais et al. | |
| 10,460,866 B2 * | 10/2019 | Ettl ....................... | H01F 27/002 |
| 2013/0248224 A1 * | 9/2013 | Gravermann ........ | H02G 15/072 |
| | | | 174/140 S |
| 2017/0316864 A1 | 11/2017 | Ettl | |
| 2019/0252871 A1 | 8/2019 | Schnitzler et al. | |

FOREIGN PATENT DOCUMENTS

| | | | |
|---|---|---|---|
| DE | 19855528 A1 | 6/2000 |
| DE | 19856025 A1 | 6/2000 |
| EP | 1056162 A2 | 11/2000 |
| EP | 2431982 A1 | 3/2012 |
| EP | 3148010 A1 | 3/2017 |
| EP | 3148027 A1 | 3/2017 |
| WO | 2017018675 A1 | 2/2017 |
| WO | 2017089023 A1 | 6/2017 |
| WO | 2017186748 A2 | 11/2017 |

OTHER PUBLICATIONS

Extended European Search Report dated Oct. 15, 2020 for European Patent Application No. 20175490.0, 8 pages.

* cited by examiner

SOCKET

CROSS REFERENCE TO RELATED APPLICATIONS

This application is a 35 U.S.C. § 371 national stage application of PCT International Application No. PCT/EP2021/061717 filed on May 4, 2021, which in turn claims foreign priority to European Patent Application No. 20175490.0, filed on May 19, 2020, the disclosures and content of which are incorporated by reference herein in their entirety.

FIELD OF THE DISCLOSURE

The present disclosure generally relates to a socket, connectable to a pluggable electrical bushing or to a plug-in cable termination. Aspects relate to a system including a socket according to embodiments of the present disclosure and a bushing or a cable termination.

TECHNICAL BACKGROUND

In power transmission and distribution, pluggable bushings or plug-in cable terminations can enable a separable electrical connection to an apparatus like a transformer or a switchgear. Non-pluggable solutions often involve a person to access the inside of the apparatus. For example, installation of a bushing on a transformer can involve a person to access the inside of the transformer in order to connect the bushing conductor to the transformer busbar. While this can be done with modest efforts during transformer assembly in the factory, installation or replacement of bushings becomes a highly demanding process if it occurs in the field.

In particular, the level of oil has to be lowered or the transformer has to be dried. Access to the connection of bushing conductor and transfer busbar has to be arranged. Transportation of transformers from the factory to the customer site is typically done with disassembled bushings for safety reasons. Thus, the installation of bushings is a very commonly occurring operation. Particularly in the case of bushings, use of a pluggable solution vastly decreases the amount and complexity of operations on site and can lower the risk of failure due to mistakes during bushing installation. In this case, a bushing is plugged into a socket installed permanently on the casing of the apparatus.

The concept of pluggable connections is widely used in gas-insulated switchgear and in cable terminations. A pluggable solution introduces an interface between the pluggable part and a socket. Special care has to be taken to assure appropriate dielectric performance of the interface and of the whole assembly.

To mitigate the risk of dielectric interface failure, a distribution of the electric stress along the interface may be uniform. Provision of an elevated mechanical pressure on the interface may also be help to enhance long-term performance and avoid dielectric interface failure.

In case of pluggable bushings, a reduction of device size and improvement of reliability may be achieved by using fine-graded bushings, also known as capacitance-graded bushings. In particular, these types of bushings include a condenser core. Pluggable bushings may be associated with an inhomogeneous distribution of the electric field, particularly electric stress, along the bushing-socket interface. Field inhomogeneity may make it desirable for the interface to be sufficiently long to maintain electric stress within design rules. Particularly because dielectric failure of dry interfaces is among the main failure modes, enough design margin has to be used.

It is therefore an object of the present disclosure to overcome at least some of the above-mentioned problems in the prior art at least partially.

SUMMARY OF THE DISCLOSURE

In view of the above, a socket is provided. The socket is connectable to a plug-in device, wherein the plug-in device is a bushing and/or a cable termination. The socket includes a current conduction path and a field control unit. The field control unit includes a layer arrangement with at least three conductive layers arranged around the current conduction path and separated by an insulating material.

In embodiments, a system is provided, the system including a socket according to embodiments described in the present disclosure. The system further includes a plug-in device, wherein the plug-in device is a bushing or a cable termination. The plug-in device includes a field control unit including a layer arrangement with at least three conductive layers arranged around a current conduction path of the plug-in device.

In embodiments, an apparatus is provided, including a socket as described in the present disclosure. The apparatus is a fluid-filled transformer or a gas-insulated switchgear.

Further advantages, features, aspects and details that can be combined with embodiments described herein are evident from the dependent claims, claim combinations, the description and the drawings.

BRIEF DESCRIPTION OF THE FIGURES

The details will be described in the following with reference to the figures, wherein.

DETAILED DESCRIPTION OF THE FIGURES AND OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

Figure 1:
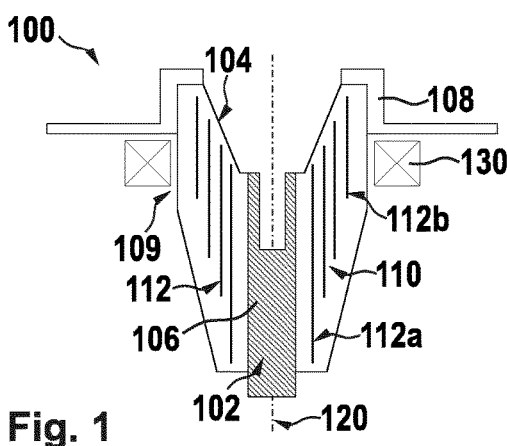
FIG. 1 is a schematic cross-sectional view of a socket according to embodiments of the present disclosure.

FIG. 1 is a schematic cross-sectional view of a socket according to embodiments of the present disclosure. The Socket 100 is connectable to a plug-in device. The plug-in device is a bushing, particularly a pluggable bushing, and/or a cable termination, particularly a plug-in cable termination. The socket 100 includes a current conduction path 102, particularly for providing an electrical connection to an apparatus.

The socket 100 further includes a field control unit including a layer arrangement 110 with at least three conductive layers 112 arranged around the current conduction path 102. The conductive layers 112 are particularly field grading layers. The conductive layers 112 are separated by an insulating material. In particular, the conductive layer is a continuous or a perforated layer. The conductive layer may be a partial layer, particularly a partial metallization of an insulating film.

In embodiments, the conductive layers 112 have a substantially cylindrical shape. The conductive layers may be are arranged concentrically around an axis 120 along the current conduction path 102. The axis 120 is particularly a central axis of the socket 100. The axis 120 may run parallel to a main direction of extension of the socket 100.

Conventional sockets, particularly for pluggable bushings, include only a field deflector. An advantage of providing a socket with a field control unit as described in the present disclosure is that a more uniform distribution, particularly a flat distribution, of electric stress along the interface to the plug-in device may be achieved. The risk of dielectric failure, particularly dielectric flashover along the interface, may be reduced. Accordingly, reliability and safety of the equipment can be improved. A length of the interface may be decreased, particularly without unduly increasing dielectric failure risk. A shorter interface can reduce an amount of raw material used. A higher production efficiency may be achieved. A shorter interface may be associated with improved thermal performance.

In embodiments, the conductive layers include a polymer material. The polymer material may include a conductive filler material. The conductive filler material may include for example metallic particles and/or carbon. The conductive filler material may include carbon-black. In embodiments, the conductive layers include aluminum. In particular, the conductive layers may include aluminum foil or consist of aluminum foil.

In embodiments, at least one of the conductive layers is formed by an electrode wound around the current conduction path 102, particularly wound around the axis 120 of the socket 100. In FIG. 1, four conductive layers are shown, including an innermost layer 112a and an outermost layer 112b.

In embodiments, the insulating material includes a thermoset resin, particularly an epoxy resin. The insulating material may include an inorganic filler, the inorganic filler particularly including silicone oxide or aluminum oxide.

In embodiments, the insulating material includes a polymer fiber mesh. The polymer fiber mesh may be a fabric or it may be nonwoven. In embodiments, the insulating material includes a cellulose material, particularly crepe paper. In embodiments, a polymer fiber material or a paper is wound around the current conduction path. The conductive layers may be inserted between the layers of the polymer fiber material or the paper.

In embodiments, the socket includes a connection surface 104 to be in contact with a surface of the plug-in device. A distance between an edge of one of the conductive layers and the connection surface may be smaller than for example 15, 12, or 6 mm. In particular, a distance between an edge of each of the conductive layers and the connection surface may be smaller than for example 15, 12 or 6 mm A distance of an edge of each of the conductive layers and the connection surface may be larger than for example 1, 2 or 3 mm.

Generally, the connection surface may correspond to an inner surface of a tapered geometric shape having rotational symmetry, particularly with respect to an axis along the current conduction path. In embodiments, the connection surface to be in contact with a surface of the plug-in part has a funnel-like shape.

In embodiments, an angle between the connection surface and the current conduction path is larger than for example 2, 3, or 4°. The angle between the connection surface and the current conduction path may be smaller than for example 45, 40, or 35°.

As shown in FIG. 1, the current conduction path may include a metal part 106 for electrical connection to the plug-in device. The metal part 106 may have a recess. The recess may be shaped to accommodate an electrical connection element of the plug-in device.

In embodiments, the current conduction path includes a metal rod for electrical connection to the plug-in device. The metal rod may be configured to be insertable into a connection element of the plug-in device. In embodiments, the current conduction path includes a metal tube for electrical connection to the plug-in device. The metal tube may be shaped to accommodate an electrical connection element of the plug-in device.

In embodiments, an innermost layer 112a of the conductive layers is electrically connected to the current conduction path 102. The innermost layer is particularly to be understood as the conductive layer located closest to the current conduction path.

In embodiments, the socket 100 includes a mounting flange 108. The mounting flange 108 may be configured for connection of the socket 100 to a wall of an apparatus.

In embodiments, an outermost layer 112b of the conductive layers is electrically connected to the mounting flange 108 of the socket. The outermost layer of the conductive layers is particularly to be understood as the conductive layer located furthest from the current conduction path.

In embodiments, the mounting flange includes a test tap electrically connected to the outermost conductive layer. In particular, the test tap is electrically insulated from the mounting flange. Electrical access to the outermost conductive layer can be enabled. The test tap may be at least comparable to test taps commonly installed on condenser bushings.

In embodiments, the outermost layer 112b of the conductive layers extends into a region outside the mounting flange 108 in an axial direction. The axial direction particularly relates to an axis 120 of the socket 100. The axial direction may coincide with a main direction of the current conduction path or a symmetry axis of the socket. The outermost conductive layer may extend beyond the mounting flange by at least for example 4, 8, or 15 cm. An electrically shielded area 109 may be provided. The electrically shielded area is particularly located in a shadow region provided by the outermost layer of the conductive layers. In particular, the outermost layer of the conductive layers is electrically grounded. The electrically shielded area may enable installation of one or more instrument transformers 130 on the socket 100. The electrically shielded area may be referred to as a current-transformer extension of a grounded layer.

Figure 2B:
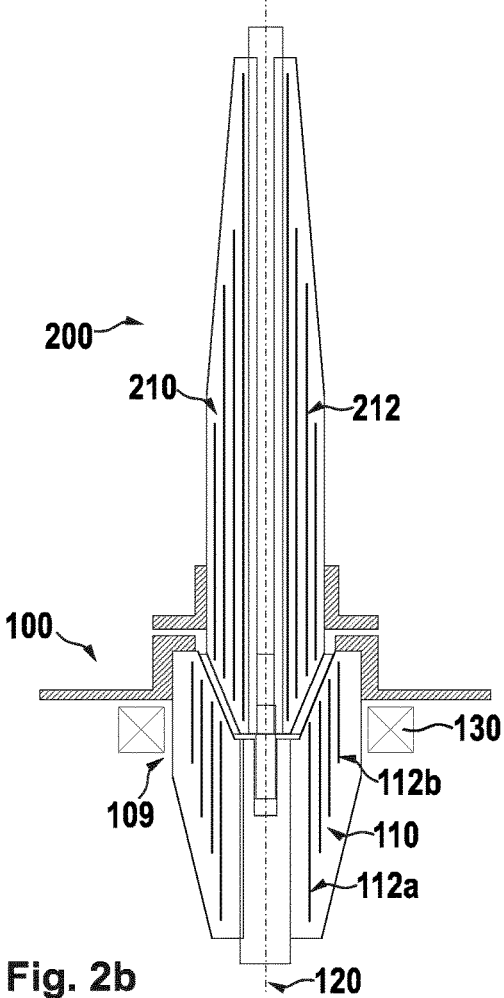
FIGS. 2a-2b are schematic cross-sectional views of a system including a socket and a bushing, according to embodiments of the present disclosure.
Figure 2A:
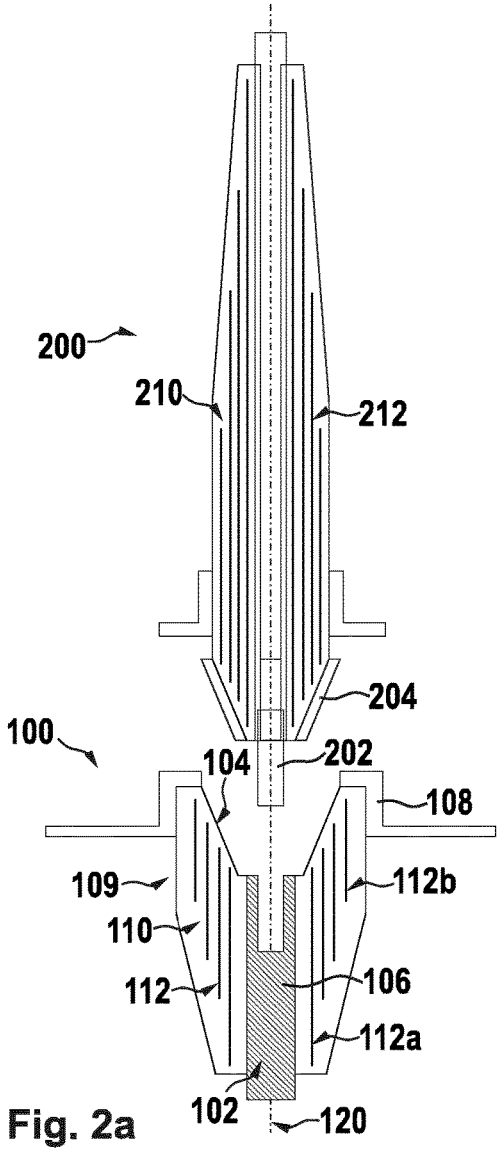

FIG. 2*a* is a schematic cross-sectional view of a system including a socket and a plug-in device, according to embodiments of the present disclosure. The plug-in device 200 shown in FIG. 2*a* is a bushing. The plug-in device 200 may include a connection element 202 for electrical connection to the socket 100. The plug-in device 200 includes a field control unit including a layer arrangement 210 with at least three conductive layers 212. The conductive layers 212 are arranged around a current conduction path of the bushing. The layer arrangement shown in FIG. 2*a* includes four conductive layers 212. Particularly in light of the advantages described above with regard to FIG. 1, the use of a capacitance-graded socket together with capacitance-graded bushing can provide a compact and reliable system.

Conventionally, in the case of pluggable bushings, the bushing is produced using capacitance-graded technology while the socket is produced using a field deflector cast into epoxy or rubber. The mix of two different technologies may be associated with a reduced production efficiency. In particular, manufacturing of the bushing and of the socket may need to take place at separate locations in the conventional solution. An advantage of a system according to embodiments described in the present disclosure is that the socket and the plug-in device may by produced using the same technology and materials. The field control units of the socket and of the plug-in device may for example be based on resin impregnated paper or resin impregnated synthetics technology. The components of the system according to the present disclosure can be produced with enhanced efficiency.

In embodiments, the plug-in device 200 includes a deformable elastic element 204 to be in contact with a connection surface 104 of the socket 100 in a connected state. The elastic element may include an elastomer material. The elastic element may include a silicone rubber. The elastic element may include an EPDM rubber.

In embodiments, the elastic element includes a material with a Young's modulus lower than for example 12, 10 or 8 MPa. The Young's modulus of the elastic element may be between 0.5 and 30 MPa, particularly between 1 and 10 MPa.

In embodiments, the elastic element includes a material with a Shore A durometer hardness lower than for example 70, 65 or 60. The Shore A durometer hardness of the elastic element may be between 20 and 90, particularly between 30 and 70.

The system shown in FIG. 2*b* corresponds at least substantially to the system of FIG. 2*a*. The system is shown in a connected state. Additionally, an instrument transformer 130, as described above with regard to FIG. 1, is installed on the socket 100. In the connected state, the socket's conductive layers 112 may be arranged relative to the plug-in device's conductive layers 212 as detailed below with regard to FIG. 3.

Figure 3:
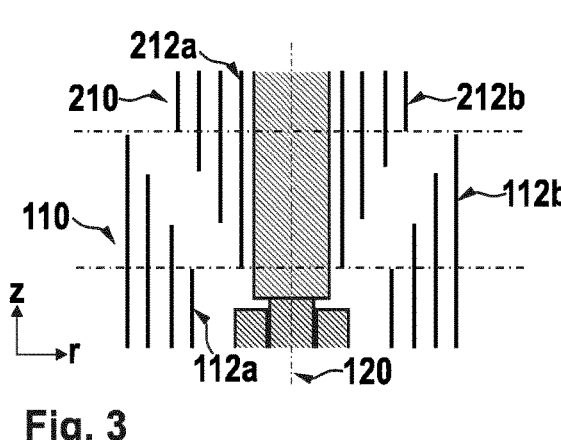
FIG. 3 shows a section of conductive layer arrangements of a system according to embodiments of the present disclosure.

FIG. 3 shows a section of conductive layer arrangements of a system according to embodiments of the present disclosure. The figure particularly relates to a system including a socket and a plug-in device, as exemplarily described above with regard to FIGS. 2*a*-2*b*. In the section shown in FIG. 3, a part of a layer arrangement 110 of the socket and a part of a layer arrangement 210 of the plug-in device can be seen. Axial and radial positions or distances of the conductive layers relate particularly to an axis 120 of the socket.

In embodiments, the socket's layer arrangement 110 includes two neighboring conductive layers having a first distance in a radial direction. In particular, the radial direction is perpendicular to an axis of the socket. A position of one of the socket's conductive layers may be shifted in the radial direction relative to a position of a neighboring conductive layer of the plug-in device by at least 25% of the first distance. An advantageous distribution of the electric field may be achieved.

In embodiments, an axial position of an edge of an outermost layer 112*b* of the socket's conductive layers corresponds at least substantially to an axial position of a neighboring edge of an outermost layer 212*b* of the plug-in device's conductive layers. A particularly advantageous distribution of the electric field may be achieved.

In embodiments, an axial position of an edge of an innermost layer 112*a* of the socket's conductive layers corresponds at least substantially to an axial position of a neighboring edge of an innermost conductive layer 212*a* of the plug-in device's conductive layers. A particularly advantageous distribution of the electric field may be achieved.

Figure 4A:
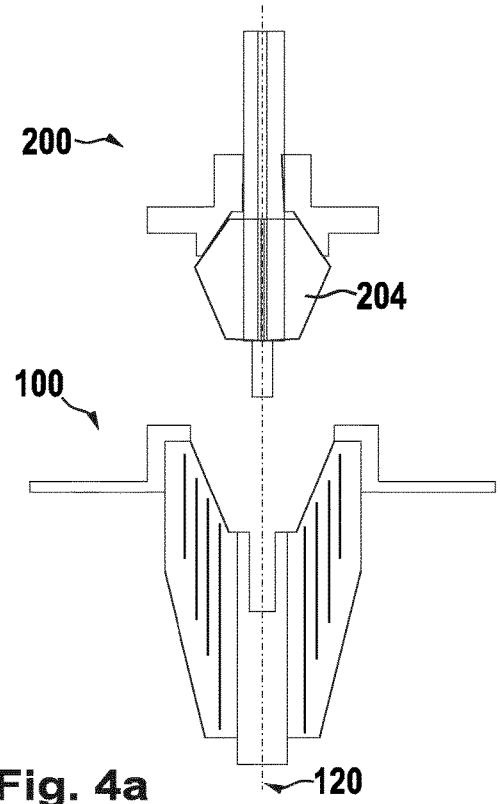
FIGS. 4a-4b are schematic cross-sectional views of a system including a socket and a cable termination, according to embodiments of the present disclosure.

FIG. 4*a* is a schematic cross-sectional view of a system including a socket and a plug-in device, according to embodiments of the present disclosure. The plug-in device 200 shown in FIG. 4*a* is a cable termination. The plug-in device 200 may include a deformable elastic element 204 to be in contact with a connection surface 104 of the socket 100 in a connected state. The elastic element may include materials and have properties as described with regard to the elastic element of the system shown in FIGS. 2*a*-2*b*. The elastic element of the plug-in device shown in FIG. 4*a* may include an electrically conductive deflector. The deflector may be configured to shape an electric field in proximity to a current conduction path of the plug-in device. In particular, the deflector may at least substantially prevent the electric field from extending to mechanical components holding the elastic element from an outer side.

Figure 4B:
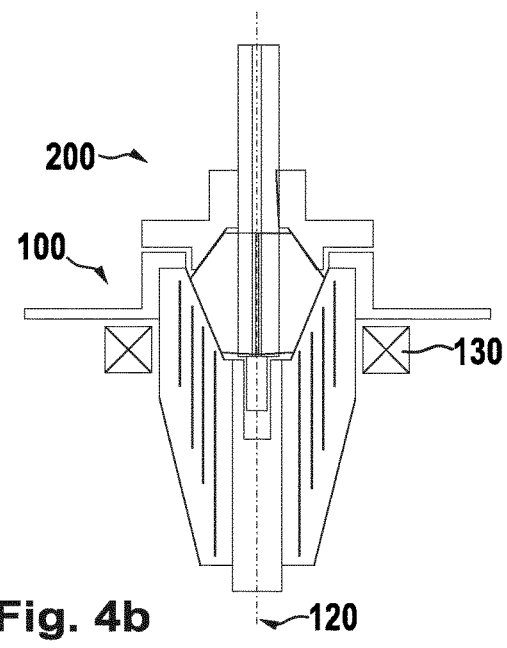

The system shown in FIG. 4*b* corresponds at least substantially to the system of FIG. 4*a*. The system is shown in a connected state. Additionally, an instrument transformer 130, as described above with regard to FIG. 1, is installed on the socket 100.

In the context of the present disclosure, the terms socket and plug-in device are particularly to be understood such that they are not limited to configurations where the socket is the female part and the plug-in device the male part. In embodiments of a socket or system according to the present disclosure, the socket may be configured as a male part and the plug-in device may be configured as a female part.

Figure 5:
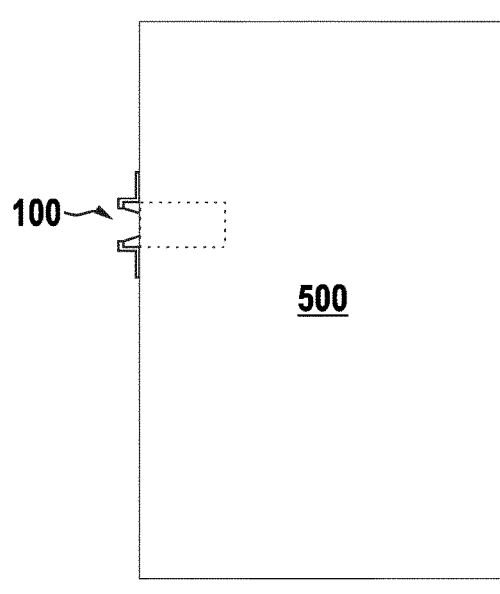
FIG. 5 is a schematic side view of an apparatus including a socket according to embodiments of the present disclosure.

FIG. 5 is a schematic side view of an apparatus including a socket according to embodiments of the present disclosure. The socket 100 may be embedded into a wall of the apparatus 500. An electrical connection to components located inside the apparatus may be provided via the socket. The apparatus may be for example a fluid-filled transformer, a gel-filled transformer, a gas-filled transformer, or a gas-insulated switchgear.

The invention claimed is:

1. A socket connectable to a plug-in device comprising a bushing and/or a cable termination, the socket comprising a current conduction path and a field control unit, and the field control unit comprising a layer arrangement with at least three conductive layers arranged around the current conduction path and separated by an insulating material, wherein the socket further includes a connection surface to be in contact with a surface of the plug-in device, wherein a distance between an edge of one of the conductive layers and the connection surface is larger than 1 mm and smaller than 12 mm, and wherein an angle between the connection surface and the current conduction path is larger than 3°.

2. The socket according to claim 1, wherein at least one of the conductive layers is formed by an electrode wound around the current conduction path.

3. The socket according to claim 1, wherein an innermost layer of the conductive layers is electrically connected to the current conduction path.

4. The socket according to claim 1, wherein the socket includes a mounting flange and wherein an outermost layer of the conductive layers is connected to the mounting flange of the socket.

5. The socket according to claim 4, wherein an outermost layer of the conductive layers extends into a region outside the mounting flange in an axial direction.

6. The socket according to claim 1, wherein the insulating material comprises a thermoset resin.

7. The socket according to claim 1, wherein the insulating material comprises resin-impregnated paper and/or resin-impregnated synthetics.

8. The socket according to claim 1, wherein the insulating material comprises an inorganic filler.

9. A system comprising a socket according to claim 1 and a plug-in device comprising a bushing or a cable termination, and the plug-in device comprising a field control unit including a layer arrangement with at least three conductive layers arranged around a current conduction path of the plug-in device.

10. The system according to claim 9, wherein the layer arrangement of the socket includes two neighboring conductive layers having a first distance in a radial direction and wherein a position of one of the conductive layers of the socket is shifted in the radial direction relative to a position of a neighboring conductive layer of the plug-in device by at least 25% of the first distance.

11. The system according to claim 9, wherein an axial position of an edge of an outermost layer of the conductive layers of the socket corresponds at least substantially to an axial position of a neighboring edge of an outermost layer of the conductive layers of the plug-in device.

12. The system according to claim 9, wherein an axial position of an edge of an innermost layer of the conductive layers of the socket corresponds at least substantially to an axial position of a neighboring edge of an innermost layer of the conductive layers of the plug-in device.

13. The system according to claim 9, wherein the plug-in device includes a deformable elastic element to be in contact with a connection surface of the socket in a connected state.

14. An apparatus comprising a socket according to claim 1, the apparatus comprising one of a fluid-filled transformer, a gel-filled transformer, a gas-filled transformer, and a gas-insulated switchgear.

15. The system according to claim 9, wherein at least one of the conductive layers is formed by an electrode wound around the current conduction path.

16. The system according to claim 13, wherein the deformable elastic element includes an elastomer material.

17. The apparatus according to claim 14, wherein at least one of the conductive layers is formed by an electrode wound around the current conduction path.

18. The socket according to claim 1, wherein the angle between the connection surface and the current conduction path is smaller than 45°.

19. The socket according to claim 1, wherein the angle between the connection surface and the current conduction path is smaller than 35°.

* * * * *